(12) United States Patent
Einhorn

(10) Patent No.: US 10,395,251 B2
(45) Date of Patent: Aug. 27, 2019

(54) REMOTELY GENERATED BEHAVIORAL PROFILE FOR STORAGE AND USE ON MOBILE DEVICE

(71) Applicant: OFFLA SELFSAFE LTD., Tel Aviv (IL)

(72) Inventor: Ori Einhorn, Erfat (IL)

(73) Assignee: Paygilant Ltd., Ramat Gan (IL)

( * ) Notice: Subject to any disclaimer, the term of this patent is extended or adjusted under 35 U.S.C. 154(b) by 407 days.

(21) Appl. No.: 15/003,490

(22) Filed: Jan. 21, 2016

(65) Prior Publication Data

US 2016/0162901 A1 Jun. 9, 2016

Related U.S. Application Data

(63) Continuation of application No. 14/786,633, filed as application No. PCT/IL2014/000022 on Apr. 24, 2014, now abandoned.

(60) Provisional application No. 61/815,798, filed on Apr. 25, 2013.

(51) Int. Cl.
| | |
|---|---|
| *G06Q 20/40* | (2012.01) |
| *G06Q 20/32* | (2012.01) |
| *G06Q 30/02* | (2012.01) |
| *G06Q 20/20* | (2012.01) |
| *G06Q 20/36* | (2012.01) |
| *G06Q 20/08* | (2012.01) |
| *G06Q 20/10* | (2012.01) |
| *G06Q 20/38* | (2012.01) |

(52) U.S. Cl.
CPC ....... *G06Q 20/4016* (2013.01); *G06Q 20/085* (2013.01); *G06Q 20/10* (2013.01); *G06Q 20/202* (2013.01); *G06Q 20/325* (2013.01); *G06Q 20/327* (2013.01); *G06Q 20/3224* (2013.01); *G06Q 20/3226* (2013.01); *G06Q 20/3227* (2013.01); *G06Q 20/3229* (2013.01); *G06Q 20/3278* (2013.01); *G06Q 20/3674* (2013.01); *G06Q 20/38215* (2013.01); *G06Q 20/40* (2013.01); *G06Q 20/405* (2013.01); *G06Q 20/4012* (2013.01); *G06Q 20/4014* (2013.01); *G06Q 20/40145* (2013.01); *G06Q 30/0201* (2013.01); *G06Q 2220/00* (2013.01)

(58) Field of Classification Search
USPC .......................................... 705/21
See application file for complete search history.

(56) References Cited

U.S. PATENT DOCUMENTS

| | | | | |
|---|---|---|---|---|
| 8,666,893 B1* | 3/2014 | Jones | ..................... | G06Q 40/02 705/38 |
| 2014/0006129 A1* | 1/2014 | Heath | ................ | G06Q 30/0222 705/14.23 |

* cited by examiner

*Primary Examiner* — Garcia Ade
(74) *Attorney, Agent, or Firm* — Finnegan, Henderson, Farabow, Garrett & Dunner, LLP

(57) ABSTRACT

A system, method and a device for offline authentication of transactions using mobile device, based on, analytic engine such as behavioral pattern detection are provided. The behavioral pattern can be for a specific person, for group of people with similar characteristics, or a combination of the two. The invention has the advantage over the prior art centralized authentication and fraud detection systems in that it more precise in identifying and preventing fraud in real time. The precision is better for both customer and merchant frauds. The present invention also requires fewer investments in infrastructure and uses less communication traffic when compared to the prior art.

14 Claims, 7 Drawing Sheets

REMOTELY GENERATED BEHAVIORAL PROFILE FOR STORAGE AND USE ON MOBILE DEVICE

CROSS REFERENCE TO RELATED APPLICATIONS

This application is a continuation of U.S. application Ser. No. 14/786,633, filed on Oct. 23, 2015, which is a national stage application of PCT Application No. PCT/IL2014/000022, filed on Apr. 24, 2014, which claims priority to U.S. Provisional Application No. 61/815,798, filed on Apr. 25, 2013. Each of the above applications is incorporated by reference in its entirety.

FIELD OF THE INVENTION

The present invention is directed to the use of mobile devices in offline transactions, and, more particularly, to a system, method and device for self-authentication of transactions.

DESCRIPTION OF THE RELATED ART

Mobile devices nowadays are in widespread use. The mobile devices of today have many uses other than plain conversation and messaging. One of the emerging fields of use for the mobile devices is for transactions such as purchasing an item.

The improved ability of mobile devices provides enhanced web capabilities (e.g. internet) and applications. The user interface has improved and thus created a platform for applications, innovative initiatives and new opportunities.

In the context of financial transactions, the mobile device can be used in many processes, when payments by which (m-payments) are one category of financial transactions implemented by the mobile platform, along with financial services (m-services) and trade (m-commerce).

It is customary to distinguish between several key procedures wherein a mobile device is involved in financial transactions:

Mobile payment—a fee, set by the transfer of money in exchange for a product or service, wherein the mobile device is involved in both the initiation and the approval of the payment. The payer can be present at the point of sale or "in movement" ("on the way") and the infrastructure that supports the payment can change.

Payment can be processed by credit card or by Prepaid-wallet. (For example: money can be transferred and deducted from the amount paid in advance or can be collected by the MNO.)

Mobile order—the mobile device is used for initiating an order but is not used for pay. (For example: ordering food via the mobile device from a restaurant and paying with cash on delivery).

Mobile delivery—the mobile device is used for delivery of goods or services but not used for payment, for example, an event entrance card issued and delivered to the mobile device.

Mobile authentication—the mobile device is used for authenticating the user details as part of the transaction or to allow access to information or other functionality. For example, code it sent to the mobile device which the user should key in online to confirm the user's identity.

Mobile banking—access to bank functionality via mobile device, through the use of a browser or an application. For example: viewing account status and transaction history through the application. It should be noted that this process allows making a payment using the mobile device.

Mobile marketing—includes loyalty campaigns, advertising and coupons.

Technology for Mobile Payments

The technologies that allow payment by mobile devices can usually be divided into two categories:

1. Remote payments—the payer and the payment device are not present at the point of sale;

2. Proximity payments—the presence of the payer and the payment device are required at the point of sale.

Technologies that Enable Remote Payment:

Text messaging via SMS & USSD—SMS communications protocol allows broadcasting messages not only between the two mobile devices, but also between the mobile device and a computer, and therefore allows m-payments. The SMS communications protocol is inexpensive and relatively simple to use and is now the more accepted method of payment using mobile device, however, the user experience is not adequate. Mobile payments derived by SMS allow transfer of funds from listed accounts or e-wallet. USSD technology is a standard for transferring information over the GSM channels and is used primarily as a method for queries and information services and is associated with information in real time achieved by calling numbers that begin with "*" or "#", and then a combination of numbers and asterisks and ending with "#". There is no option to store and forward information, but the response time of USSD is better than SMS. Interactive Voice Response (IVR)—Communication with a computer server via a telephone call over the cellular network, usually via dialogue menus by voice or phone keyboard input. This technology has limited user interface and user experience is not optimal.

Mobile internet—is typically used for web browsing via small mobile devices as mobile phones.

Technologies that require the presence of payer at the point of sale (Proximity):

NFC (Near Field Communication)—technology that allows devices to perform contactless transactions at short-term distance (approx. 4 cm or 1.5 inch in practice), access digital information and link electronically between devices. The NFC has number of variations e.g. NFC Stickers, microSD, integrated device.

QR Code (Quick Response Barcode)—matrix barcode that can be read by a reader of QR Code and by a mobile device with a camera. The encoded information can be text, URL or other form of data.

Card acceptance on a mobile device—external devices to the mobile device allowing receipt of payment and/or credit card information charging/payment application, such as Square or "PayPal Here"

Mobile Payments (m-payments) 'players' point of view will now be described both from the supply side and the demand side.

Supply Side—Providers of Payments Service in Mobile:

Mobile network operators (MNO's)—MNO's have been striving to achieve a return on their investments in infrastructure during the last two decades, which resulted in part an increased use of air time and data transfer usage. For them, the m-payments have the option to diversify the range of products and services that correspond to the client's needs and lifestyle.

Financial institutions (Fis)—Fis wanted to 'stay in the game' and maintain their status (e.g. profit) and relationship with the client even with the mobile payments environment as they do today in the physical payments environment, for example issuing "payment credentials".

Manufacturers of mobile phones—(Original Equipment Manufacturers a.k.a. OEMs)—OEMs have the ability to decide which technologies to implement in the various devices and which uses to allow.

Success using the mobile phone as a payment method has the potential to influence towards significant sales increase of mobile phones to new customers as well as significant sales increase of mobile phones to customers upgrading existing devices to those enabling m-payments.

Trusted Service Managers (TSMs)—third party neutral intermediary or a service provider providing a single integration point for all the cellular operators (MNOs), for all the financial institutions (Fis), transit authorities and retailers who want to provide mobile payment applications, ticketing applications or loyalty applications for their clients, characterized in that the applications are using NFC technology in the mobile devices. They are owners or managers of the "Secure Element".

Main functions of the TSM include, among other things, engagement with mobile network operator and applicative service providers, ensuring the protection and security from end to end which includes ensuring compliance with security requirements for software, hardware, cell phones, chips and applications, risk management of scams. They are also responsible for customer service and support in the context of Secure Element, which include customer alerts for loss, theft and reporting fraudulent transactions. Additional tasks include updating user interfaces, customer database management, life cycle management of applications, management services that are "value-added" as reloading tickets and more.

Technology providers—mobile payments (m-payments), like any other technology, are driven by new developments, and hold great opportunities for manufacturers and suppliers of technology and system integration. Among those the following can be included:

chip manufacturers producing the smart card's chips which can host the payment application or the secure element (SE);

SE Issuers—(secure element issuers) match the chip with the appropriate protection component;

service providers offering services for end users, such as authentication services, and the TSM allows the service provider to use the secure element.

Demand Side:

Merchants—for them m-payment at point of sale (POS) can lead to higher capacity (throughput) in checkout and the ability to expand the use of, utilize the mobile platform and send marketing messages in real time. Unmanned points of sale or remote points of sale can benefit from this form of payment by the reduction in costs. Also remote mobile payments are another channel with lower costs for merchants.

Consumers—from the perspective of the end consumer, the mobile device has become an integral part of his life, the consumer carries it everywhere and it achieved a status that can be described as "permanent share of pocket", i.e. with wallet and keys, it is always with the consumer. Moreover, as the consumers' confidence rises, they feel more comfortable to exercise more than one function of the device, and it is slowly turning into a multimedia device with many applications.

NFC (Near Field Communication) Technology

NFC technology, designed to make a connection between different devices based on their physical proximity, simplifies the initiation of communication between devices, also making this a much more natural thing for a user, as part of the natural user interface (NUI) trend.

The technology began as a joint development of Sony and chip maker NXP back in 2002, and is based on RFID (Radio Frequency identification) chips.

RFID tag contains (identification) information which it transmits as a response to a radio signal received from a reader as such. The NFC technology differs from RFID in that it adds security and limits the communication range to 10-20 cm (approx. 4-8 inches) or less in reality, to ensure that only deliberate approximation of the tag to a scanner will share information. In addition, it allows using the tag for other needs, such as a workplace identification tag, payment card for public transportation and substitute means for payment at the store.

The areas of NFC use can be divided into three types of activities:

"Sharing"—transfer of information between two chips. One chip is a device with a power source and functions as a reader, while the other is a passive chip, with no power source, which is used as a tag containing information.

The active chip produces a limited field of radio waves, sufficient for the passive chip to send the information found on it, for example, Smart Poster.

"Transaction"—payment transactions. In this case communication is between an active device connected to the banking system and active or passive chip that contains customer information. In fact, this type of this interaction is a substitute for cash and credit cards, because it allows the transfer of money between compatible devices, provided that one of them is pre-loaded with any amount, or a transaction brokered with the credit card company.

"Coupling"—occurs when both parties are active chips. In this case, two-way information transfer will occur between two devices using the Peer to Peer method, as in the Bluetooth technology.

Payment Card Fraud

Payment card fraud occurs when an element (e.g. person) creates financial or material gain by the use of payment means or payment means information to complete a transaction that is not approved by the legal account holder. Lack of approval of the account holder is an essential characteristic characterizing this phenomenon. An approval system for payment card transactions sieves transactions to limit fraud. The system verifies the card, extracts the card's data and decides whether the transaction is subject to certain restrictions set by the issuer or merchant. It could be said that the system checks whether the transaction is in line with the known behavior of the card owner and if this is the ease, then in most probability the transaction is being performed by the owner of the card.

In general terms, current systems for approval of payment card transactions use a statistical model (for example) for identification of fraudulent transactions. The efficiency of the statistical model is verified in hindsight. This is done by applying the statistical model to known transactions. If the statistical model alerts that 1000 transactions are suspected as fraud but only 10 transactions are actually fraudulent, then the fraud detection ratio of the statistical model is 1:100. If the statistical model alerts that 100 transactions are suspected as fraud but only 10 transactions are actually fraudulent, then the fraud detection ratio of the statistical model is 1:10. 1:100 is said to be a statistical model with lower fraud detection ratio then 1:10. The aim of the developers is to lower the amount of false alarms, without missing the detection of real fraudulent transactions.

However, since no statistical model is foolproof, in practice there is always a need to balance between two extremes: a model that will find almost every fraudulent transaction but with many errors (false positive) and a model that will not have many errors but will also miss on real fraud (false negative).

In the current systems it is impossible to check every suspected transaction because it will create an enormous load on the resources of the computing system.

As a result, current systems compromise and do not check every transaction, even though some transactions can be fraudulent.

Transition to electronic payments allows a number of channels to collect payment card data: mobile readers keep cards data; readers imposed over ATM (Skimming); Video Cameras that can capture and copy PIN numbers; utilizing the Internet—sending millions of email messages so a few recipients will expose the credit card data and their accounts (phishing); hackers can infiltrate computer systems and steal data volume from where it is stored or transmitted (data breaches), etc.

It should be noted that payment card data can also be collected in the 'traditional way' as a result of the card being lost or stolen.

Ongoing struggle with fraud drove their extent down. Among the factors that decreased the rate of fraud were the following:

Transition to EMV card with transactions at points of sale.

Use of Dual Factor Authentication and dynamic authentication (one-time passwords by token, SMS, software, etc.) for CNP (Card Not Present) transactions (mainly online).

PCI DSS—broad implementation of information security standards in the payment cards industry. The Payment Card industry Data Security Standard is a common standard for credit companies since 2004.

Better intelligence of the credit card companies (network intelligence), risk evaluation, alerts to consumers in near real time.

Better sharing of fraud knowledge management by all parties in the industry.

The EMV Standard

EMV initials represent the names of the companies Europay, MasterCard and Visa, which were the original founders of the EMV standard.

The term EMV refers to specification of technical requirements for payment, usually payment cards type of Credit or Debit, in which microchips are embedded and is designed to combat fraud.

These cards require a code to initiate a transaction, and are safer. There are several types of payments using these cards, including Chip plus PIN (the most common) and Chip plus Choice (selection between signing and PIN as a cardholder identity verification). Those kinds of security measures are known as VISA's Dynamic passcode authentication (DPA), and MasterCard's Chip Authentication Protocol (CAP).

In remote transactions, were the card cannot be presented, a reader device is used. The customer enters a PIN. An application residing on the chip on the EMV card generates a one-time password (OTP), specific to the current transaction.

Since the card was swiped through the reader and a PIN was entered, this amounts to Dual Factor Authentication.

However, it should be noted that this security measure is applied to all CNP transactions. There is no enhanced scrutiny against a specific transaction suspected to be fraudulent.

Prior Art System and Method

An example for the system used nowadays is brought up in FIG. 1. The system comprises:

the customer's credit card 60;

the point of sale (POS) 70 where the customer makes a payment using the credit card 60;

the clearing house 80;

the issuer 90 which issued the credit card 60.

FIG. 2 describes an exemplary method for approving a transaction using the system that was described in FIG. 1.

In step 510 the card 60 is used by the customer to initiate a transaction in the POS 70. The transaction details are sent in step 520 from the POS 70 to the clearing house 80. The clearing house 80 routes, in step 530, the transaction to the card issuer 90. The issuer 90 generates in step 540 a response to the transaction. The response could be one of the following:

Approve—the transaction is approved.

Decline—the transaction is declined.

Kill—the credit card should be put out of use.

Referral—the merchant or the customer who owns the card should call the issuer credit card company) 90.

The response is routed in step 550 from issuer 90 to the clearing house 80. In step 560 the clearing house 80 routes the response to the POS 70. At the POS 70, in step 570, the transaction is committed or declined according to the response.

It should be noted that in this prior art systems, small amount transactions are not always sent for approval. This is because the investment in infrastructure in order to verify small amount transactions would not be cost effective compared to the gain.

The prior art systems are based on a server in the issuer (e.g. bank) premises which does the fraud detection checks for millions or tens of millions of customers. This amounts to tens (or even more) of checks per second.

Therefore the amount of time per check should be less then tenth of a second.

It also should be noted that it takes time for the communication to pass from the POS to server and for the confirmation or decline of the transaction to travel back from the server to the POS.

During the check, the server has to retrieve all the needed information needed for processing and perform a large amount of complex mathematical calculations.

In practice, these servers are very expensive. Therefore the issuer compromises on the quality of the statistical models and the quantity of the checks.

The result is that the level of coverage and accuracy are insufficient and there are many mistakes:

classifying legitimate transactions as fraudulent (false positive);

classifying fraudulent transactions as legitimate (false negative).

In practice, due to the low level of accuracy, transactions are rarely blocked.

US patent application, publication no. 2010/0327056, discloses a payment approval system and a method for approving a payment for credit cards. The method comprises obtaining fraud parameters by modeling a pattern of fraud usage and for self-authentication (offline approval). However, when self-authentication (offline approval) process estimates a possibility of fraud usage, online approval for more detailed statistical analysis processing is requested from a remote computer.

PCT publication no. WO12006/012538 discloses a methods and apparatus for transaction completion using a proximity integrated circuit payment device i.e. smartcard. The merchant system retrieves information from the smartcard and determines whether the transaction should be completed online or offline.

None of the current technologies and prior art, taken alone or in combination, does not address the issue of offline authorization, self-authentication and fraud detection of a transaction, e.g. there is no handling of the security aspects of the transaction without requesting the bank or the credit card company for approval. There is also no solution to the issue of using a statistical model with lower suspicious rate then current statistical models without blocking the transaction or the card.

SUMMARY OF THE INVENTION

In one embodiment of the present invention, there is provided a system method and a device for offline authentication of transactions using mobile device, based on, analytic engine such as behavioral pattern detection.

The behavioral pattern can be for a specific person, for group of people with similar characteristics, or a combination of the two.

The present invention has the advantage over the prior art centralized authentication and fraud detection systems in that it is more precise in identifying and preventing fraud in real time. The precision is better for both customer and merchant frauds. The present invention also requires fewer investments in infrastructure and uses less communication traffic when compared to the prior art.

These and other features of the invention will be more readily understood upon consideration of the attached drawings and of the following detailed description of those drawings and the presently-preferred and other embodiments of the invention.

DETAILED DESCRIPTION

Figure 1:
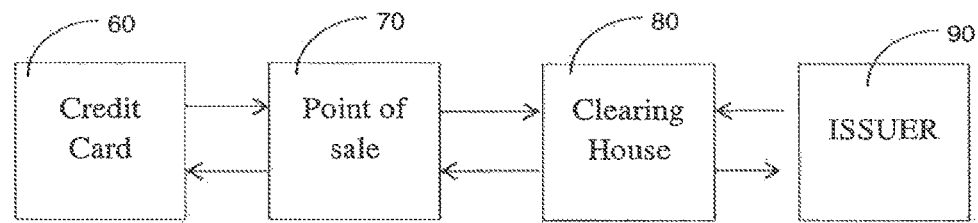
FIG. 1 is an exemplary prior art payment system.

The following terminology will be used throughout the description:

ACH

Short for "Automated Clearing House", a nationwide electronic network for financial transactions. The network clears credit and debit transactions. Rules and regulations for the network are set by NACHA and the Federal Reserve.

Acquirer, Merchant Acquirer

Either a bank, a processor or independent sales organization (ISO) handling the merchant's card acceptance. A processor or ISO will work with an acquiring bank, which is needed to officially accept payment on behalf of the merchant.

AML/ATF

Anti-Money Laundering/Anti-Terrorist Financing

Associations, also referred to as "Payment brands" or "Network"

In the world of credit and debit cards, this is a legacy term that referred to ownership of networks by groups of financial institutions. Today, the word is sometimes used to refer to companies such as MasterCard, Visa, American Express, Discover, STAR, NYCE and others which regulate card acceptance rules and interchange for their member financial institutions.

Authorization

The process by which an association or a network requests an approval from the issuer (e.g. bank), on behalf of the merchant. Once a transaction is authorized, the association sends the approval to the merchant acquirer, who passes it along to the merchant. Then the customer can complete the purchase.

Chargebacks

The refusal or reversal by the issuing bank of a transaction presented by the merchant acquirer. Chargebacks result when an issuer returns or charges hack the purchase amount to the merchant.

Clearing

The process by which the merchant acquirer sends purchase information to the association or network, which in turn sends it along to the issuer (e.g. bank). The issuer then prepares the information for the customer's statement.

CNP

Card not present, transaction without the presence of the card, taking place over the mail or the phone or the internet (e-commerce)

Compliance

With respect to credit and debit cards, it refers to all the rules and regulations merchants must meet in order to have the right to accept electronic payments, adhering to formats such as the Payment Cardholder Industry Data Security Standard (PCI DSS).

Customer

Refers, but is not limited to, to the person who wishes to perform a transaction at a point of sale.

EFT Network

Short for "electronic-funds-transfer" network, a telecommunications and payments infrastructure that connects consumers, ATMs, merchants and banks. There are two types of transactions: those at ATMs and those from signature-debit cards at POS terminals.

EMV Standard

Europay MasterCard Visa, a global standard for cards, POS, and ATM terminals in relation to credit and debit card payments.

FI

Short for "Financial institution". A financial institution acts as an agent that provides financial services for its clients or members. Financial institutions generally fall under financial regulation of a government authority. Common types of financial institutions include banks, building societies, credit unions, stock brokerages, asset management firms, and similar businesses. Financial institutions provide a service as intermediaries of the capital and debt markets. They are responsible for transferring funds from investors to companies, in need of those funds.

Fraud Detection Ratio

The ratio between the number of alerts to actual fraud detection. The statistical model, used for alerting suspicious transactions, is verified in hindsight. This is done by applying the statistical model to known transactions and counting how many of the alerts are actually real frauds.

Issuer

A term used to define who issues the credit or debit card. The issuer bears the risk, essentially vouching for the creditworthiness of the customer after approving the customers transaction.

Mandate

In payments, the "mandate" is the authorization required.

Merchant

Merchants functions as professionals who deal with trade, dealing in commodities that they do not produce themselves, in order to produce profit.

MNO

Short for "Mobile Network Operator". MNO is a company that provides service and has its own frequency allocation of the radio spectrum. It also has the entire infrastructure required to provide mobile telephone service.

Mobile Payment Device

A device used for mobile payment, which can be, but not limited to, a cellular phone, also known as mobile phone, or a credit card as long as the device has memory, processor for executing a program and the ability for data communication. The data coat can be done for example, via cellular data communication (3G, 4G), Wi-Fi, Bluetooth, NFC or any combination thereof.

m-Payment, Mobile Payment

A payment where the mobile phone is involved in the initiation and/or confirmation of the payment. The payer may or may not be 'mobile or on the move'.

NFC

Near Field Communication (NFC) is a short-range high frequency wireless communication technology which enables the exchange of data between devices up to a ten or twenty centimeter (four or eight inches) distance in theory (less than that in practice). The technology is a simple extension of the ISO 14443 proximity-card standard that combines the interface of a smartcard and a reader into a single device.

Non-Cash Payments

Payments made with instruments other than notes and coins, i.e., using credit transfers, direct debits, credit or debit cards or checks.

PIN

Personal Identification Number

PIN-Based Debit

A process where debit transactions are routed through EFT networks or Visa and MasterCard's online EFT networks, requiring a PIN. Electronic authorization of every transaction and the debits to a customer's checking account is reflected immediately. Also known as "online debit."

POS

Short for "Point Of Sale". The site where a customer makes payment via credit or debit cards. Generally terminals are at the cash register, the checkout counter in a retail shop, but mobile terminals at restaurants, theme parks, computer stores and other merchants are changing where transactions can be conducted.

Processor

A company that handles all or some of the functions of a credit or debit transaction, ranging from providing terminals to managing back-end settlement.

SE—Secure Element

Also known as Security Element. Physical place used for user authentication, authorization and stored credentials; it houses confidential information.

Settlement

Process by which the issuing bank sends payment to the association, which in turn sends it to the merchant acquirer. The acquirer then funds the merchant account.

In an exemplary embodiment of the present invention, system, method and a device for self-authentication (offline approval) of transactions using mobile device, based on, analytic engine such as behavioral pattern detection are provided. This is in contrast to current central authentication systems as known in the prior art.

In general terms, one of the steps in the method of the present invention is storing a profile of the customer on the customer's mobile payment device. This profile, (e.g. behavioral pattern), stores, for example, the behavior of the customer and the personal details of the customer. For example, the profile is updated when the customer travels to another country, or when the personal status of the customer changes (i.e. marriage, children).

As is known to those skilled in the art, the associations or financial institutions (e.g. issuers), currently store a profile of the customer in order to approve the transactions. However, due to the large volume of transaction approval requests that should be processed in fractions of a second, especially at peak times, the best known models for fraud detection cannot be implemented. In order to implement the best known models and process the transaction in the desired time, many powerful processing units are needed, which would have resulted an investment which is not cost effective.

Furthermore, even if those best models would have been implemented, they would still have produced large amounts of false positive (tagging and alerting legitimate transactions as fraudulent). Not only that, but these models would have missed fraudulent transactions as well (false negative). It is obvious that missing fraudulent transactions, as well as handling false identification, creates a toll on the financial institutions.

For the reasons described hereinabove, fraud detection ratio lower then 1:10 (1:11, etc.) is not dealt by the issuers as fraud. Such a ratio means that there would be too many false positives as there are frauds thus creating a load on the issuer to check all those transactions, and also the possibility of troubling many customers which have done nothing wrong.

In the present invention however, since the fraud detection engine operates in the mobile payment device of the customer, it is now possible to put more stringent requirements, taking the risk of high levels of false positive alerts. This is made possible in the current invention since, in the case of alert, the customer can be prompted, for example, to enter a code or biometric data as a general rule or in case of doubt. All of this is being done offline, e.g. without accessing the associations or financial institutions, thus taking a load of them.

Also, in the current invention there is no actual limit on the processing power, since the transaction authorization is performed on the personal mobile payment device of the customer. Instead of using a central server, processing is now distributed and this amounts to more processing power in comparison to the prior art central server. Since more processing power is now available, the customer's profile, which stores for example the behavioral pattern of the customer, can be more complex and accurate. The current invention also has the advantage that it avoids sending data from the POS the central server and receiving confirmation or decline, thus avoiding the communication time which is required by the prior art. The time spent by the current invention is the net time for calculating whether a transaction is fraudulent. Another advantage of the invention over the prior art is that customer's profile can be updated per change (incremental) in real time, in contrast to the prior art where all the profiles of the customers are stored on a central location and due to the large volume of data updates are being done once in a while for all the records.

As a result, the limitations of the prior art are overcome and the system is less prone to fraud abuse.

As will be described in greater detail hereinafter, in principle the mobile payment device will have the related software residing in a secure area and consuming relatively a small size. This part of the software will rarely by updated. Contrary to that, the file containing the behavioral pattern will be updated frequently. This file is also relatively large and encrypted, its decryption being done by the software residing in a secure area.

Figure 3:
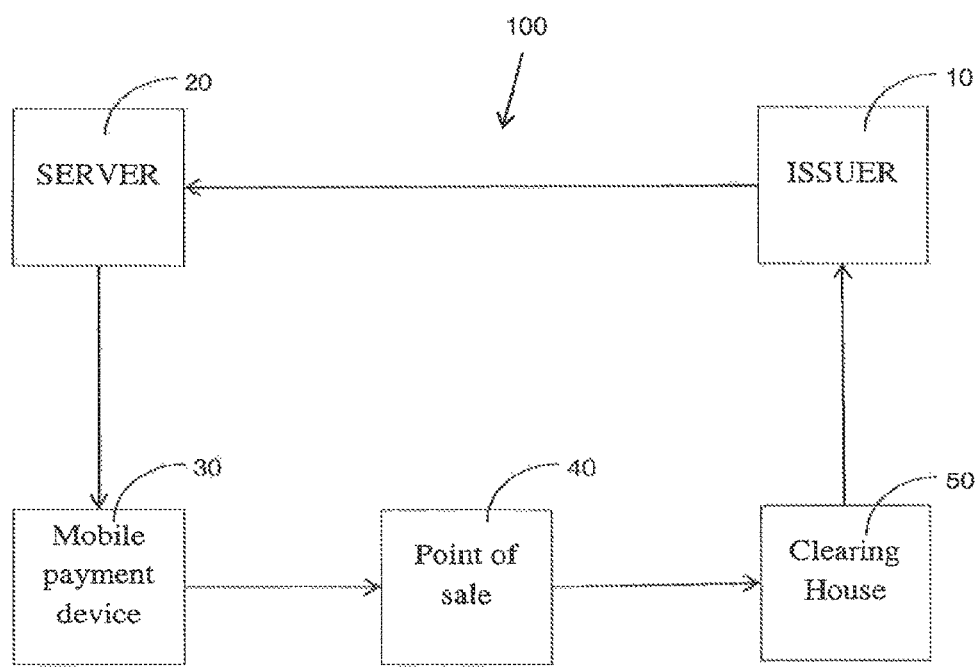
FIG. 3 is an exemplary payment system in accordance with the preset invention.

Referring to FIG. 3, an exemplary payment system 100 will be described. The exemplary system 100 includes the following elements:

an issuer 10 which in exemplary embodiment is the credit card company or a bank, server 20 which in exemplary embodiment can be one server or plurality of servers, residing at the issuer's premises or at separate location, mobile payment device 30 which in exemplary embodiment can be, but is not limited to, a mobile telephone device or a credit card, point of sale (POS) 40, clearing house 50.

It is to be understood that the elements of the system are connected to each other via standard communication lines, either wire line or wireless, as known in the art.

It should be understood that some elements are presented as separate elements for the sake of clarity only. In another exemplary embodiment, several elements from the group comprising the server, issuer and the clearing house could be grouped together to form one element.

Figure 4:
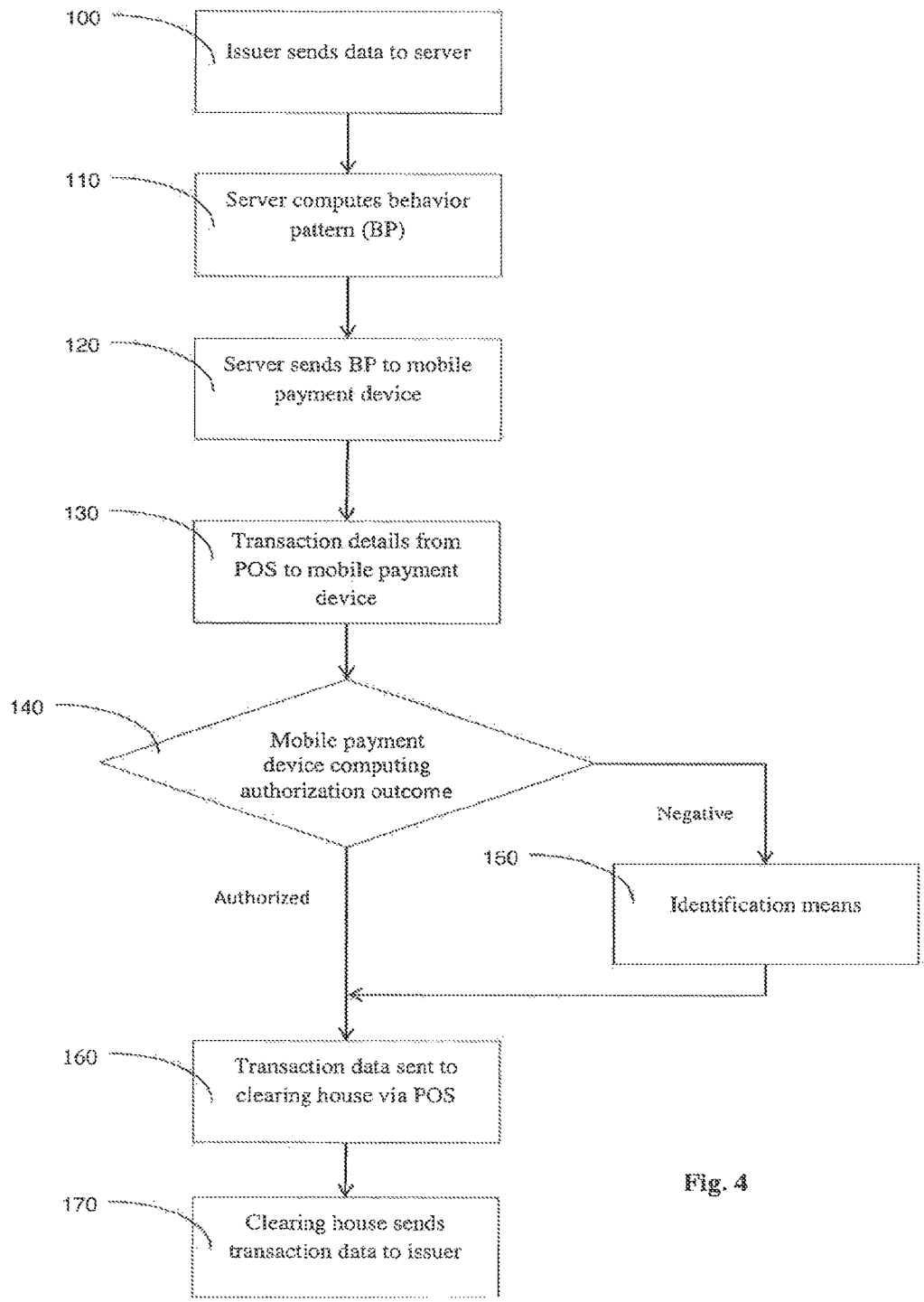
FIG. 4 is a flow chart of an exemplary method of secure purchase in accordance with the preset invention.

Referring to FIG. 4, an exemplary method of secure purchase with self-authentication will now be described. In step 100, the issuer 10 sends the transactional data of the customer to the server 20. In step 110, the server 20 computes a unique behavioral pattern of the customer. The behavioral pattern is sent to the mobile payment device 30 in step 120.

When the customer wishes to perform as transaction, the customer's mobile payment device 30 receives from the point of sale 40 the transaction details in step 130. In an exemplary embodiment, the transactions details comprise the merchant ID, time of the transaction and the sum amount of the transaction.

In step 140 the mobile payment device 30 computes whether the transaction can receive authorization, based on the behavioral pattern received in the mobile payment device, described in step 120.

If the outcome of the computation in step 140 is negative, then the customer will be asked in step 150 to enter identification means. The mobile payment device 30 then verifies the identification means. If the verification fails, then the customer will not be able to perform the transaction.

Steps 140 and 150 will be referred to hereinafter as the verification process and will be further detailed later on.

However, if the transaction is authorized by the mobile payment device 30, either in step 140 or 150, then transaction data is sent to in step 160 via the POS 40 to the clearing house 50.

In step 170 clearing house 50 sends the transaction data to the issuer 10.

Figure 5:
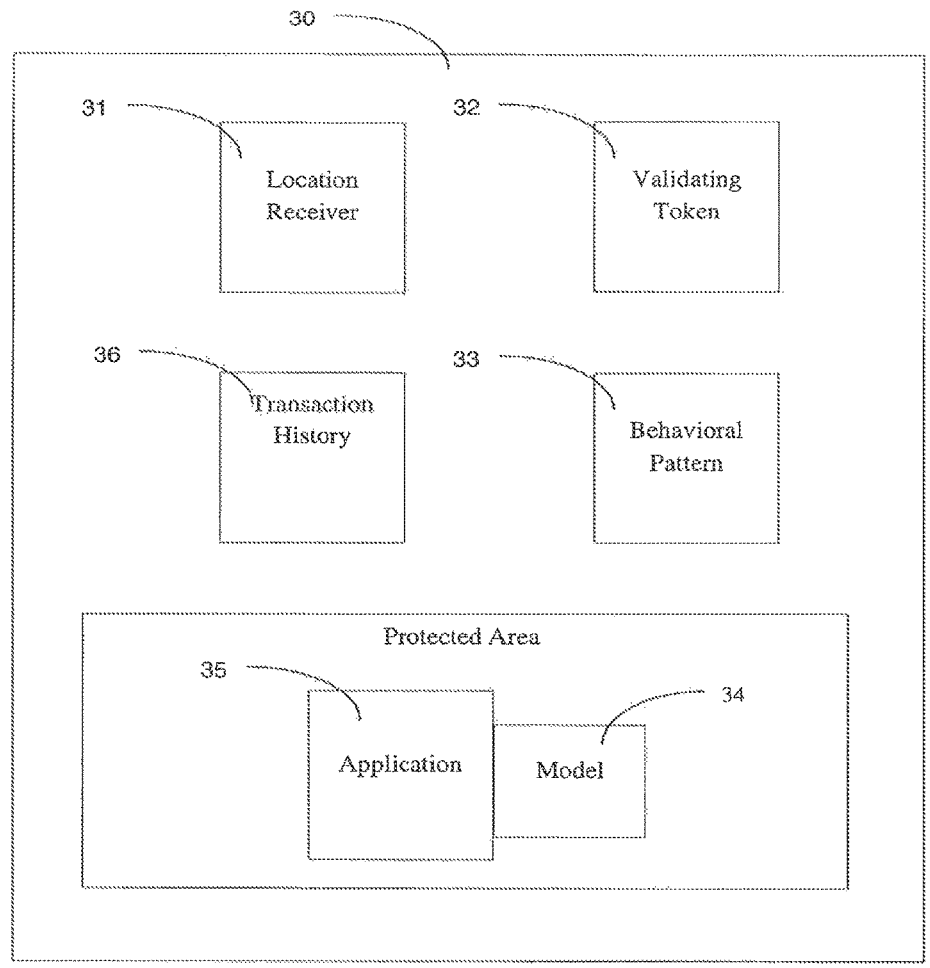
FIG. 5 is an exemplary mobile payment device in accordance with the preset invention.

Referring now to FIG. 5, the exemplary mobile payment device 30 in accordance with the present invention will now be described.

The exemplary mobile payment device 30 contains among other elements the following elements:

Location receiver 31 for calculation of the mobile payment device location using data received. The received data can be, and is not limited to, GPS (global positioning system) data received from orbiting satellites, position data received via base station e.g. TOA, triangulation, etc. or any combination thereof. Methods for locating the position of a mobile device are well known in the art and will not be discussed further here. Validity token 32 stores a token based in an exemplary embodiment on One Time Password (OTP), well-known to those skilled in the art. The validity token is received from the server 20. It is replaced once every known period which in an exemplary embodiment could extend from a few minutes to a few days, depending on the needed level of security, to verify that the mobile payment device is in order and is not blocked.

In an exemplary embodiment, if the mobile payment device was stolen then it is considered not in order. In another exemplary embodiment, the mobile payment device will be blocked if the user had reached the allowed limit for accumulated transactions (credit limit), i.e. not Open To Buy (OTB). Another exemplary option for blocking the mobile payment device is if the user has entered incorrect identification means such as, but not limited to, wrong password. It will be understood by those skilled in the art that blocking the device due to wrong password can be activated after a predefined number of false retries. Replacing the token can take place for example either by SMS or WE-FI or voice communication, or mobile data.

In the event that the valid validity token was not received in the mobile payment device, then the payment software will be 'locked', i.e. not usable, a procedure well known in the art, hi another exemplary embodiment, the entire functionality of the mobile payment device will be halted. For example, if the mobile payment device is cellular phone, then it will not be able to make outgoing calls.

In another exemplary embodiment, it is possible to take immediate action for disabling the mobile payment device, without waiting for the token to expire. For example, if a transaction has exceeded the allowed limit, the mobile payment device can be instructed, by a remote command, to 'lock' the payment software. Another option is to initiate the 'locking' of the payment software by the customer and/or service representative, for example, in the case that the mobile payment device was stolen.

Behavioral pattern 33 is for example, an encrypted file or files or any other collection of data, received from the server 20. The file (or files) describes the behavior profile of the customer and similar customers. In an exemplary embodiment, the file can also describe the behavior profile of fraudulent persons or specific customer encrypted rules. This file does not necessarily need to reside in a secure area as opposed to the model 34, because it is relatively large when compared to the model, and because it is encrypted. It can reside, for example, in the memory of the mobile payment device. The behavioral pattern is unique for every customer. In an exemplary embodiment however, one mobile payment device can support two or more files representing different behavioral patterns of different users or customers. In another exemplary embodiment, one mobile payment device can support two or more files representing different behavioral patterns of different cards from different issuers related to the same customer.

Model 34 is a software element implementing one or more algorithms.

In an exemplary embodiment, the algorithm can be the logistic model. As known to those skilled in the art, this model is basing its predictions by the deviation from the regular behavior of the customer.

In another exemplary embodiment, the algorithm can be the known in the art rule based engine related to the specific customer encrypted rules that were sent to element 33 form the server 20.

In yet another exemplary embodiment, the algorithm can be a data mining function implemented in the form of a decision tree or neural network engine as is known in the art.

The model resides inside a protected area, which is secure and not accessible for users after the initial installation. In an exemplary embodiment, the protected area can be located in a secure area inside the SIM card of the mobile device, as implemented for example by Google's Android operating system. In another exemplary embodiment, the protected area can be located in the memory of the device as implemented for example by Apple's iOS operating system.

The model 34 uses the data or rules that were stored with element 33 for rejecting or approving the transaction. This is done by decrypting the encrypted behavioral pattern file or data or rules, and, when a transaction takes place, calculating the probability for fraud based on the behavioral pattern or data or rules and the transaction details. In another exemplary embodiment, the outcome of the calculation by the model can be a request for higher level of security, implemented for example by requesting the customer to enter one or more codes, in different lengths, as defined by the requested security level. The application 35 also resides in the protected area. As will be readily understood by those skilled in the art, the application communicates with the other elements of the mobile payment device and executes the different algorithms which are part of the various methods of the current invention.

Figure 2:
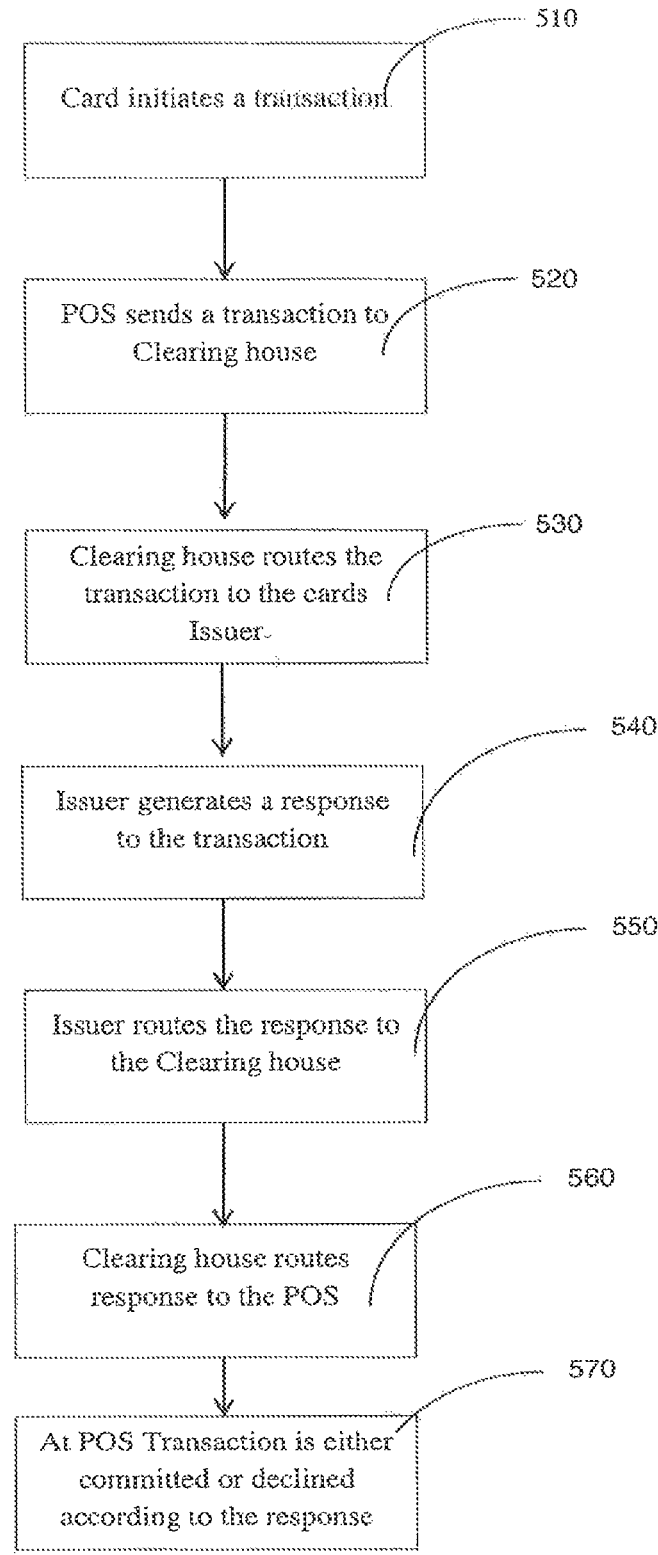
FIG. 2 is a flow chart of an exemplary method for transaction approval used with the prior art payment system.
Figure 6:
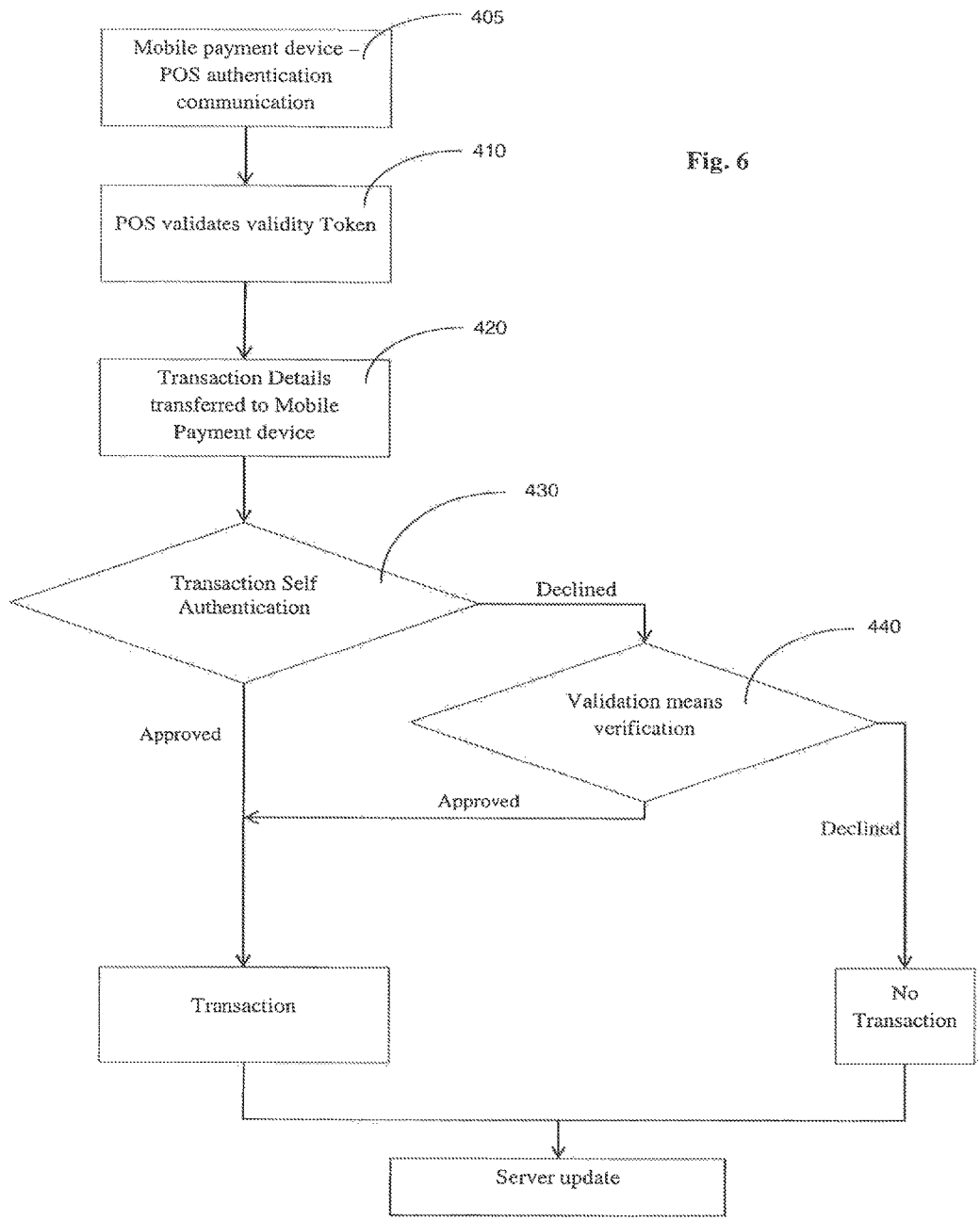
FIG. 6 is an exemplary verification process in accordance with the preset invention.

Referring now to FIG. 6, an exemplary verification process (steps 140 and 150 in FIG. 2) in accordance with the present invention will be described.

In step 405 the mobile payment device and the POS initiate communication. The communication is short ranged in order to achieve security and avoid ears dropping. Examples of short range communication include, among others, NFC and Bluetooth, as is well known for those skilled in the art. The mobile payment device identifies itself to the OOS either by key exchange or by a standard protocol as defined in the NFC specifications.

In step 410 the POS 40 validates the validity token 32. This step is optional, since as described hereinabove, the functionality of the mobile payment device will halt in the case that a valid token does not exist.

In step 420 the transaction details are transferred to the mobile payment device 30 from the POS. In an exemplary embodiment the transaction details comprise merchant ID, time of the transaction and the sum amount of the transaction.

In step 430 the model 34, based on the behavioral pattern 33 approves or denies the transaction.

If the model in step 430 denied the transaction, then the customer will be asked in step 440 to enter identification means. The identification means can be, and not limited to, password, biometric characteristic of the customer, or a combination thereof. The mobile payment device 30 verifies the identification means. If the verification fails, then the customer will not be able to perform the transaction. An update on the failure is sent to server 20 and from the server to the issuer 10. The issuer can consider blocking (i.e. lock) the customer from further use of the payment software as was previously described.

If, however, the customer was successful in the verification of step 440, the server 20 will be updated with the transaction details and also with location data so the server can update the profile of the customer.

In an exemplary embodiment, the system can be used to track merchant fraud in addition to customer fraud that was described hereinabove. If, for example, there is suspicion that a certain transaction was not carried out by the customer, the mobile payment device could be interrogated for approving or denying that this transaction ever took place. It is to be understood by those skilled in the art that this embodiment requires the mobile payment device to keep track of the customer's transactions, as can be seen in element 36 of the mobile payment device 30 in FIG. 5.

Figure 7:
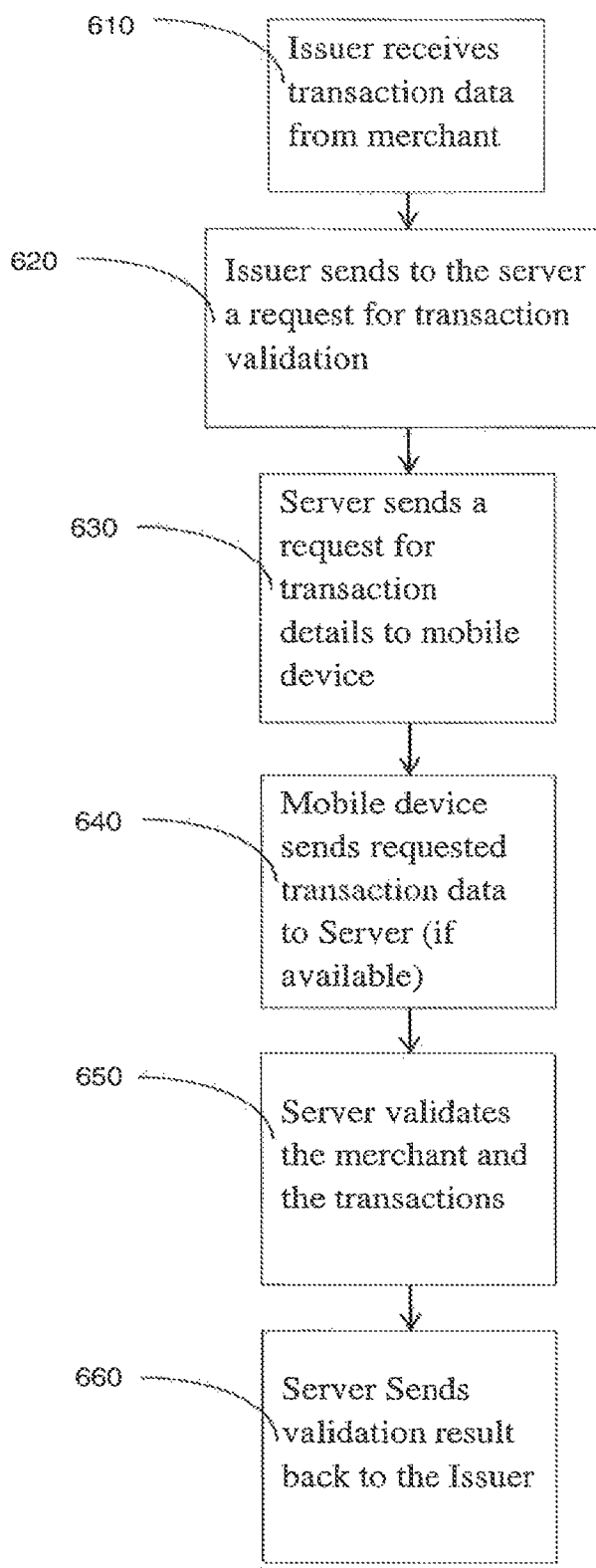
FIG. 7 is an exemplary validation process for a merchant in accordance with the preset invention.

FIG. 7 describes in more detail an exemplary method for merchant verification.

In step 610 the issuer 10 receives transaction data from the merchant. In order to verify that the transaction indeed took place, in step 620 the issuer 10 sends to the server 20 a request for transaction validation. In step 630 the server 20 sends a request to the mobile payment device 30 for the transaction details. The mobile payment device, in turn, sends the requested transaction details or a response that the details are not available, to the server 20. The server 20 validates the transaction and the merchant in step 650 if the transaction details are available and then sends the results of validation to the issuer 10.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A non-transitory computer readable medium storing instructions that, when executed by at least one hardware-based processor, cause the at least one hardware-based processor to perform operations comprising:
   receiving, from a mobile payment device, past user activity data associated with a user of the mobile payment device;
   computing a behavioral profile for the user based, at least in part, on the received past user activity data, wherein the behavioral profile is generated at a location remote from the mobile payment device and is configured to be stored on and used by the mobile payment device; and
   transmitting the behavioral profile to the mobile payment device for local use the mobile payment device in offline fraud detection, wherein the offline fraud detection occurs without contacting a remote server during the course of a real time financial transaction involving the mobile payment device;
   wherein the transmitting is performed according to at least one of:
      according to a predetermined schedule, or
      in response to computing the behavioral profile.

2. The non-transitory computer readable medium of claim 1, wherein the past user activity data includes information about conduct of the user, gleaned from the mobile payment device.

3. The non-transitory computer readable medium of claim 1, wherein the past user activity data includes information about prior financial transactions of the user.

4. The non-transitory computer readable medium of claim 1, wherein the behavioral profile is computed based on both the past user activity data and activity data of users of other mobile payment devices.

5. The non-transitory computer readable medium of claim 1, wherein transmitting the behavioral profile further comprises transmitting a validity token to the mobile payment device, the validity token enabling the mobile payment device to perform the offline fraud detection.

6. The non-transitory computer readable medium of claim 1, wherein the operations further comprise identifying a change to a profile associated with the user, and computing an updated behavioral profile for the user based, at least in part, on the change to the profile.

7. The non-transitory computer readable medium of claim 1, wherein the operations further comprise identifying known fraudulent behavior, and computing an updated behavioral profile for the user based, at least in part, on the identified known fraudulent behavior.

8. A computer-implemented method for remotely generating a behavioral profile for storage and use on a mobile payment device comprising:
  receiving, from the mobile payment device, past user activity data associated with a user of the mobile payment device;
  computing a behavioral profile for the user based, at least in part, on the received past user activity data, wherein the behavioral profile is generated at a location remote from the mobile payment device and is configured to be stored on and used by the mobile payment device; and
  transmitting the behavioral profile to the mobile payment device for local use by the mobile payment device in offline fraud detection, wherein the offline fraud detection occurs without contacting a remote server during the course of a real time financial transaction involving the mobile payment device;
  wherein the transmitting is performed according to at least one of:
    according to a predetermined schedule, or
    in response to computing the behavioral profile.

9. The computer-implemented method of claim 8, wherein the past user activity data includes information about conduct of the user, gleaned from the mobile payment device.

10. The computer-implemented method of claim 8, wherein the past user activity data includes information about prior financial transactions of the user.

11. The computer-implemented method of claim 8, wherein the behavioral profile is computed based on both the past user activity data and activity data of users of other mobile payment devices.

12. The computer-implemented method of claim 8, wherein transmitting the behavioral profile further comprises transmitting a validity token to the mobile payment device, the validity token enabling the mobile payment device to perform the offline fraud detection.

13. The computer-implemented method of claim 8, further comprising identifying a change to a profile associated with the user, and computing an updated behavioral profile for the user based, at least in part, on the change to the profile.

14. The computer-implemented method of claim 8, further comprising identifying known fraudulent behavior, and computing an updated behavioral profile for the user based, at least in part, on the identified known fraudulent behavior.

* * * * *

UNITED STATES PATENT AND TRADEMARK OFFICE
CERTIFICATE OF CORRECTION

PATENT NO. : 10,395,251 B2  
APPLICATION NO. : 15/003490  
DATED : August 27, 2019  
INVENTOR(S) : Ori Einhorn Page 1 of 1

It is certified that error appears in the above-identified patent and that said Letters Patent is hereby corrected as shown below:

In the Claims

Claim 1, Column 14, Line 55, "for local use the mobile payment" should read -- for local use by the mobile payment --

Signed and Sealed this  
Twenty-fifth Day of February, 2020

Andrei Iancu  
*Director of the United States Patent and Trademark Office*